United States Patent [19]

Kmiecik et al.

[11] Patent Number: 5,752,553
[45] Date of Patent: May 19, 1998

[54] FUEL TANK FILLER PIPE

[75] Inventors: Daniel John Kmiecik, Dearborn Heights; Ronnie E. Smith, Ypsilanti; Daniel P. Forbes, Belleville; Michael John Boehk, Ypsilanti, all of Mich.

[73] Assignee: Ford Motor Company, Dearborn, Mich.

[21] Appl. No.: 748,080

[22] Filed: Nov. 13, 1996

[51] Int. Cl.⁶ .................................................. B65B 1/04
[52] U.S. Cl. .................. 141/286; 141/311 A; 141/392; 220/86.2
[58] Field of Search .................. 141/311 R, 382, 141/383, 386, 392, 286; 220/86.2, 86.3, 731; 138/39, 42

[56] References Cited

U.S. PATENT DOCUMENTS

| | | |
|---|---|---|
| 1,766,916 | 6/1930 | MacLiver . |
| 1,931,342 | 10/1933 | Broderick . |
| 1,971,714 | 8/1934 | Harkness . |
| 2,371,241 | 3/1945 | Jaffa . |
| 2,496,992 | 2/1950 | Glidden . |
| 3,002,649 | 10/1961 | Turley . |
| 3,369,695 | 2/1968 | Johnson ................. 220/86.2 |
| 3,500,879 | 3/1970 | Meyer ................... 141/286 |
| 3,827,461 | 8/1974 | Gilman ................... 138/39 |
| 4,199,332 | 4/1980 | Krohn et al. . |
| 4,284,105 | 8/1981 | Moked et al. ............ 138/42 |
| 4,327,783 | 5/1982 | Kanno et al. . |
| 4,344,544 | 8/1982 | Austin . |
| 4,526,286 | 7/1985 | Jung et al. . |
| 4,759,458 | 7/1988 | Fischer . |
| 4,830,067 | 5/1989 | Foutch . |
| 5,327,871 | 7/1994 | Gryc . |
| 5,348,177 | 9/1994 | Sung . |
| 5,439,129 | 8/1995 | Buechler . |
| 5,507,324 | 4/1996 | Whitley, II et al. . |

*Primary Examiner*—Henry J. Recla
*Assistant Examiner*—Steven O. Douglas
*Attorney, Agent, or Firm*—Neil P. Ferraro

[57] ABSTRACT

A fuel filler pipe for a fuel filler system of an automotive vehicle includes a generally helical directional control surface disposed within the fuel filler pipe and extending along the longitudinal axis thereof. The directional control surface guides fuel flowing through the filler pipe so as to impart a spiral flow to the fuel such that the fuel flows with reduced turbulence and subsequent vapor generation. In addition, the directional control surface restricts backward flow of fuel from the fuel tank through the fuel filler pipe.

17 Claims, 3 Drawing Sheets

FUEL TANK FILLER PIPE

FIELD OF THE INVENTION

This invention relates to automotive fuel tank filler pipes, and in particular, to filler pipes for reducing turbulence of entering fuel and restricting backflow of fuel.

BACKGROUND OF THE INVENTION

Vehicles are refueled by dispensing fuel from a filling nozzle at a filling station into a vehicle fuel tank. Because of fuel turbulence associated with filling the fuel tank, fuel vapor may be generated in the fuel tank. This vapor must be managed by either the filling station dispensing apparatus or the vehicle on-board fuel vapor recovery system. Therefore, reducing turbulence, and subsequently vapor generation, during vehicle refueling is desirable.

In addition, as the fuel in the fuel tank is consumed by the engine, a volume of space exists above the fuel level in the fuel tank. High temperature or sloshing of the fuel in the tank may create fuel vapor having a pressure above atmospheric pressure. Upon refueling, the fuel filler cap is removed and the pressure in the fuel tank is relieved to the filling station dispensing apparatus or the vehicle on-board fuel vapor recovery system. In some cases, it is possible that liquid fuel in the fuel tank may flow out through the fuel filler pipe due to the pressure differential between the fuel vapor and atmosphere. This backflow of fuel may cause the filling nozzle to prematurely shut off.

Backflow of fuel may also occur at the completion of the refueling process. An excess pressure may arise inside the tank such that soon after the fuel filler nozzle is switched off, the energy that acted in the filling direction through the fuel filler nozzle is no longer present and the pressure in the fuel tank causes a liquid fuel column to flow out through the filler pipe.

Prior art devices have been used to restrict the backflow of fuel from the fuel tank. The inventors of the present invention have discovered certain disadvantages with these devices. For example, some devices use hinged doors or other movable devices within the fuel filler neck which serve as a check valves to prevent backward flow through the fuel filler pipes. These devices are generally multi-component, requiring a precisely fitting assembly to prevent binding of cooperating components. Other devices undesirably restrict fuel flow in both directions. In addition, none of these prior art devices have the added feature of reducing fuel vapor generation during refueling.

SUMMARY OF THE INVENTION

An object of the present invention is to reduce the turbulence of fuel entering the fuel tank, thereby reducing vapor generation while restricting backflow of fuel from the fuel tank. In one particular aspect of the invention, this object is achieved and disadvantages of prior art approaches are overcome by providing a novel apparatus having a generally helical directional control surface adapted to extend within a fuel tank filler pipe. The helical directional control surface guides fuel flowing through the filler pipe so as to impart a spiral flow to the fuel such that the fuel flows with reduced turbulence, thereby reducing vapor generation. The helical directional control surface also restricts backflow of fuel.

According to another aspect of the invention, a novel fuel tank filler pipe for connection between an automotive fuel tank and a filler neck is provided. The filler pipe includes a cylindrical tube having first and second ends, inner and outer sidewalls and a longitudinal axis. The first end of the tube is positioned toward the fuel tank and the second end is positioned toward the filler neck. A generally helical directional control surface extends within the tube and guides fuel flowing through the filler pipe so as to impart a spiral flow to the fuel such that the fuel flows with reduced turbulence, thereby reducing vapor generation. The helical directional control surface also restricts backflow of the fuel.

An advantage of the present invention is that vapor generation during refueling of the fuel tank is reduced.

Another, more specific advantage of the present invention is that fuel fill turbulence is reduced.

Yet another advantage of the present invention is that backflow of fuel upon refueling is reduced.

Still another advantage of the present invention is that a reliable, easily manufacturable fuel filler pipe is provided.

Still another advantage of the present invention is that assembly ease is increased.

Other objects, features and advantages of the present invention will be readily appreciated by the reader of this specification.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 1:
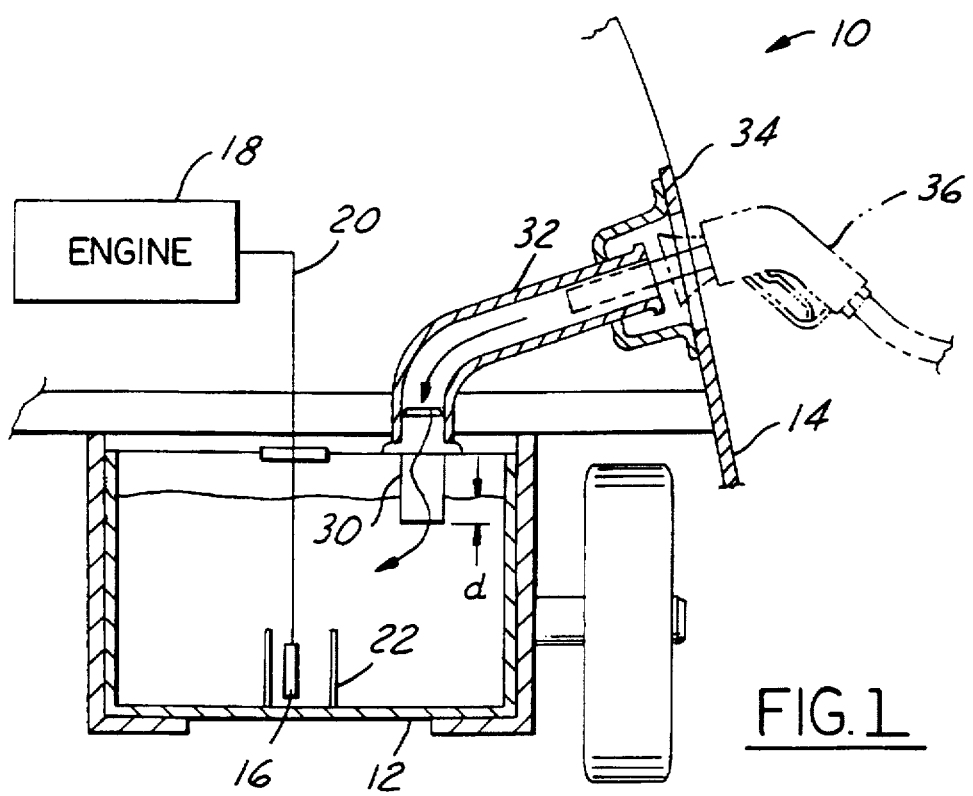
FIG. 1 is a diagrammatic view of a fuel supply system of an automotive vehicle showing a fuel filler pipe according to the present invention.

Fuel tank filler system 10, shown in FIG. 1, includes fuel tank 12 mounted to vehicle 14. Electrically operated fuel pump 16, located at the bottom of fuel tank 12, pumps fuel from fuel tank 12 to engine 18 through line 20. Typically, pump 16 is disposed within reservoir 22 within fuel tank 12. Reservoir 22 serves the function of ensuring that the inlet to fuel pump 20 remains submerged, especially during cornering maneuvers or low fuel conditions.

Fuel tank filler system 10 also includes fuel filler pipe 30 shown mounted to fuel tank 12 and at least partially extending therein. Filler neck 32 is clamped to filler pipe 30 using a suitable clamping means and extends to quarter panel 34 of vehicle 14. Fuel fill nozzle 36, shown in phantom, delivers fuel to filler neck 32 which in turn direct fuels to fuel filler pipe 30 and into fuel tank 12.

Figure 2:
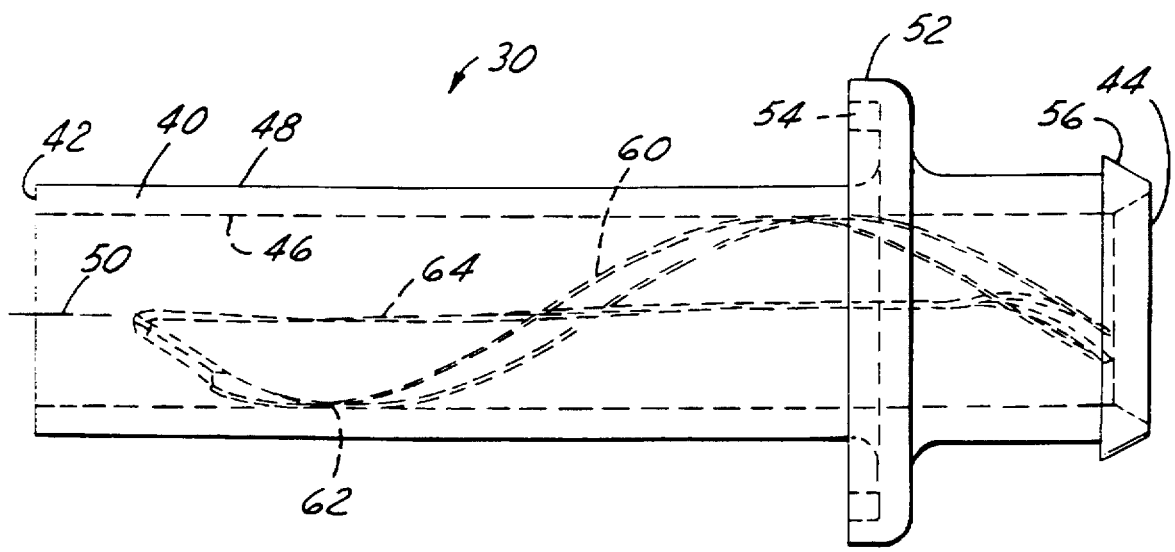
FIG. 2 is a side view of the fuel filler pipe according to the present invention.
Figure 3:
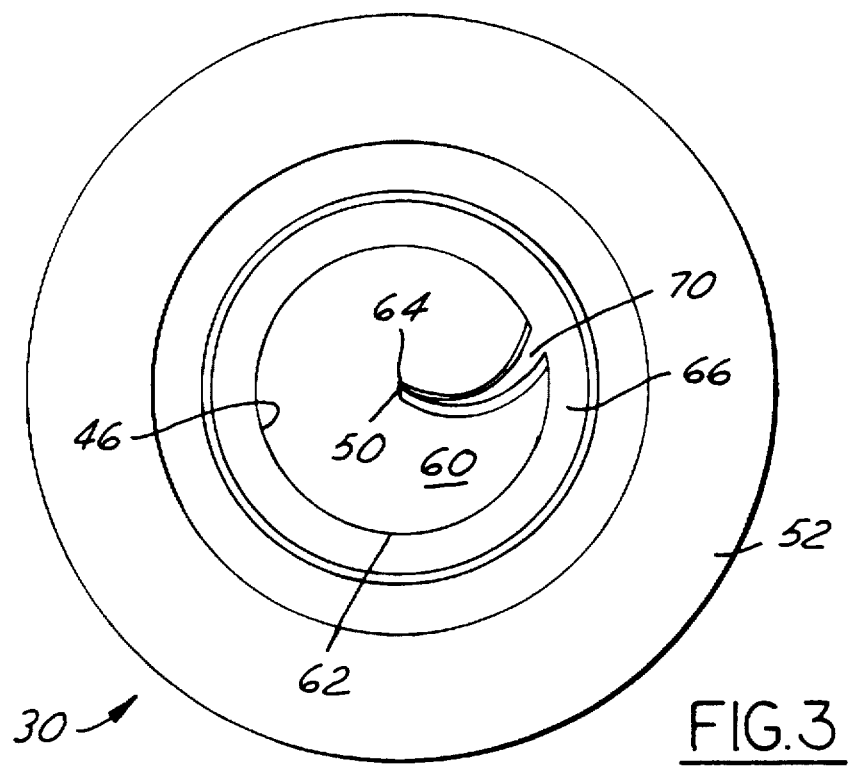
FIG. 3 is an end view of the fuel filler pipe according to the present invention.
Figure 4:
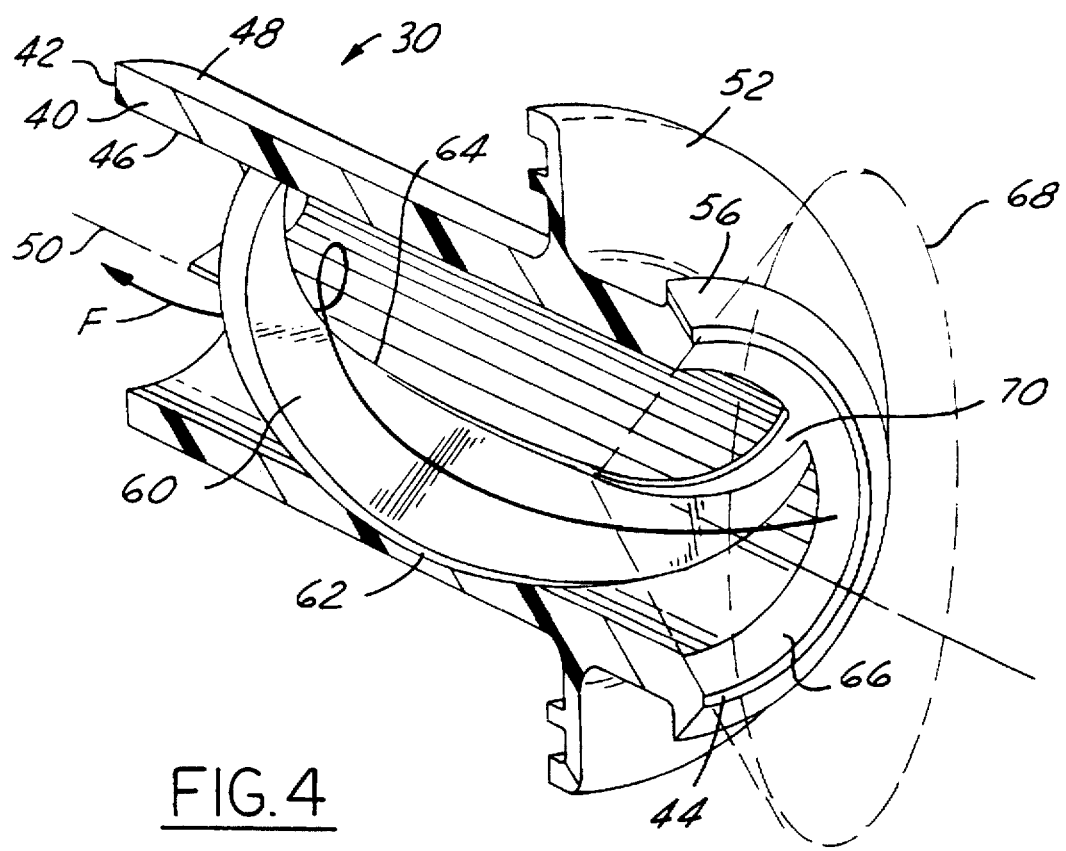
FIG. 4 is a cross-section through the fuel filler pipe according to the present invention.

As best shown in FIGS. 2–4, fuel filler pipe 30 is formed of cylindrical tube 40 having first and second ends 42, 44 and inner and outer sidewalls 46, 48. First end 42 is positioned toward fuel tank 12 and second end 44 is positioned toward filler neck 32 (FIG. 1). Axis 50 defines the longitudinal axis of tube 40. Mounting flange 52 is formed on outer sidewall 48 of tube 40 and has recess 54 formed therein to enhance hot plate welding of filler pipe 30 to fuel tank 12. Tube 40 also includes a backwardly extending rib portion 56 located at second end 44, which, when inserted into filler neck 32, provides an additional means for preventing filler neck 32 from disengaging with fuel filler pipe 30.

According to the present invention, filler pipe 30 includes a generally helical directional control surface 60 disposed within and extending along the length of tube 40. Helical directional control surface 60 directs fuel into fuel tank 12 so that a spiral motion is imparted on the fuel, shown as arrow "F" in FIG. 4. This spiral motion reduces turbulence of the fuel entering the fuel tank because the fuel follows a predetermined path which has the effect of reducing splashing within filler pipe 30 and subsequently reduces fuel vapor during refueling. As shown in FIG. 2, helical directional control surface 60 has a length sufficient such that one complete revolution is provided for each bit of fuel entering fuel tank 12.

As previously stated, upon removing the fuel filler cap (not shown) or upon the termination of the fuel filling procedure, the pressure inside fuel tank 12 may cause a sudden backflow of fuel through fuel filler pipe 30. Helical directional control surface 60 provides a substantial restriction to this backward flow such that any backward flowing fuel loses momentum as the fuel flows through filler pipe 30 and contacts helical directional control surface 60. This enables the fuel to drain back into fuel tank 12. The aforementioned restriction is a result of the fuel following a lengthy path defined by directional control surface 60. As will be described hereinafter, the frictional drag encountered by the backward flowing fuel also causes the fuel to lose momentum.

Helical directional control surface 60 includes outer edge 62 and inner edge 64. Outer edge 62 is formed adjacent inner sidewall 46 while inner edge 64 lies substantially along longitudinal axis 50. Because inner edge 64 extends to longitudinal axis 50, no central core or conduit exists that would otherwise allow fuel to flow through filler pipe 30 without contacting helical directional control surface 60, thereby defeating the intended purpose of imparting a spiral motion on the fuel flowing through fuel filler pipe 30 or restricting backflow of fuel from fuel filler pipe 30. Thus, in the end view shown in FIG. 3, fuel contacts directional control surface 60 when flowing through filler pipe 30.

Fuel filler pipe 30 may be made of an injection moldable material, such as HPDE or the like. Because helical directional control surface 60 rotates so as to complete one revolution, the mold used to form filler pipe 30 may be easily produced with two cores inserted from either end 42, 44. This less complex manufacturing process results in a fuel filler pipe requiring minimal secondary machining or assembly operations, thereby reducing cost and complexity. In addition, because there are no moving parts in fuel filler pipe 30, the potential of those parts binding upon forward or reverse flows is eliminated.

Referring now in particular to FIG. 4, fuel filler pipe 30 is formed with a chamfer 66 at second end 44 of tube 40. Chamfer 66 extends into fuel filler pipe 30 so as to truncate the end of helical directional control surface 60, as shown by the dashed cone 68, to form chamfer 70 on helical directional control surface 60. Chamfers 66, 70 provide uniform flow distribution of fuel entering fuel filler pipe 30.

Fuel filler pipe 30 may be mounted to fuel tank 12 such that fuel flowing out of fuel filler pipe 30 is directed toward reservoir 22 by helical directional control surface 60, as shown in FIG. 1. This is desirable when reservoir 22 is located remotely from filler pipe 30. If, for example, fuel tank 12 is empty and the vehicle operator desires to fill the tank with a limited amount of fuel, helical directional control surface 60 directs the fuel toward the reservoir 22, and subsequently fuel pump 16, thereby avoiding the possibility of this limited amount of fuel collecting at a location remote from fuel pump 16. In addition, fuel filler pipe 30 extends into fuel tank 12 a distance of about 10 millimeters below the fuel level of a full fuel tank, shown at "d" in FIG. 1, to provide a maximum length of helical directional control surface 60 for imparting a spiral motion on the fuel and restricting backflow of fuel.

Figure 5:
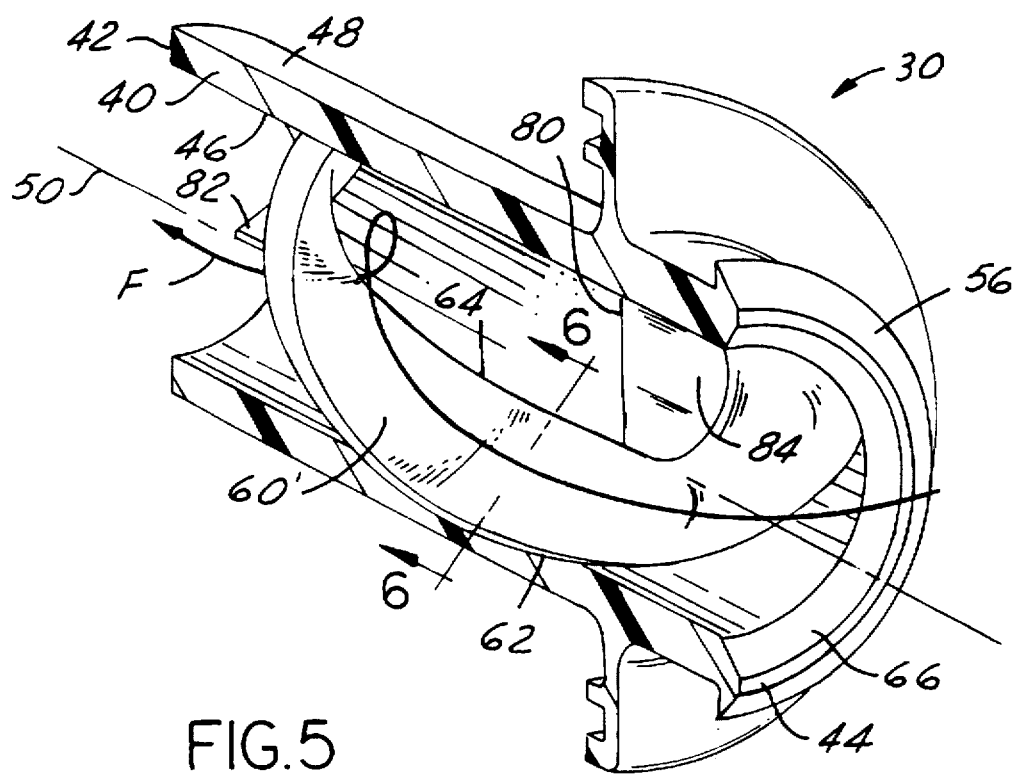
FIG. 5 is an alternative embodiment of the fuel filler pipe/according to the present invention; and, FIG. 6 is a section view taken along line 6—6 of FIG. 5.

An alternative embodiment according to the present invention is shown in FIG. 5. To further limit or restrict backflow of fuel from fuel tank 12 through filler pipe 30, helical directional control surface 60 deviates from the path shown in FIGS. 2–4 such that, in addition to outer edge 62 being attached to inner sidewall 46, inner edge 64 also becomes attached to inner sidewall 46 at second end 44 of tube 40 to form pocket 80. As a result, any backwardly flowing fuel will encounter pocket 80 at underside surface 82 of helical directional control surface 60 to further restrict backflow of fuel. In addition, longitudinally extending wall 84 may be formed attached between inner edge 64 and inner sidewall 46 and extending toward first end 42 to further enclose pocket 80 and thereby further restrict backflow of fuel.

Figure 6:
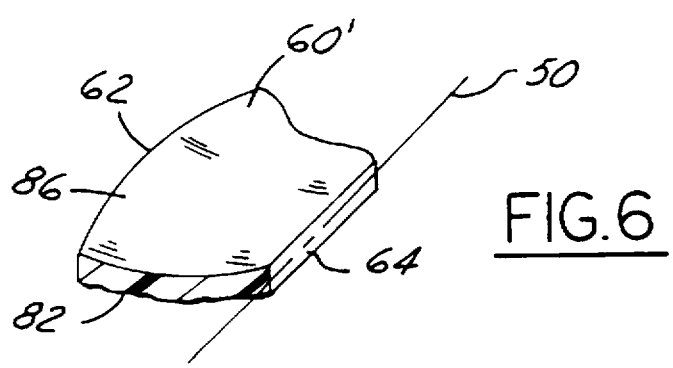

In one embodiment, helical directional control surface 60' has a generally rectangular cross section. In an alternative embodiment, helical directional control surface 60' is formed with a generally concave inlet flow surface 86, as shown in FIG. 6, which is a section view of helical directional control surface 60' taken along line 6—6 of FIG. 5. For the sake of clarity, tube 40 has been removed in FIG. 6. This concave inlet flow surface 86 further enhances the spiral flow pattern of fuel flowing through fuel filler pipe 30 so as to reduce the aforementioned turbulence and subsequent vapor generation. As previously stated, the frictional drag encountered by the backward flowing fuel also causes the fuel to lose momentum. This may be enhanced by forming a relatively rough underside surface 82, shown in FIG. 6, as compared to the relatively smooth inlet flow surface 86, so as to provide a greater restriction to backflow of fuel.

Those skilled in the art will recognize in view of this disclosure that rather than providing a standalone fuel filler pipe, an insert being formed with helical directional control surface 60 may be provided. According to this embodiment, the insert is placed inside a standard fuel filler pipe so as to reduce turbulence of entering fuel and subsequent vapor generation as well as backflow of fuel. The insert may include a sleeve formed about helical directional control surface 60. The sleeve is then placed inside the standard fuel filler pipe. Alternatively, helical directional control surface 60 alone may be adapted to fit within the standard fuel filler pipe, whereby outer edge 62 of helical directional control surface 60 lies adjacent the inner wall of the standard fuel filler tube.

While the best mode for carrying out the invention has been described in detailed, those skilled in the art in which this invention relates will recognize various alternative designs and embodiments, including those mentioned above, in practicing the invention that has been defined by the following claims.

We claim:

1. An apparatus comprising:
   a generally helical directional control surface adapted to extend within a fuel tank filler pipe and to a center thereof, with said helical directional control surface comprising an outer edge and an inner edge, with said outer edge adapted to lie adjacent an inner sidewall of the filler pipe and with said inner edge adapted to lie substantially along a central longitudinal axis of the filler pipe, with said helical directional control surface guiding fuel flowing through the filler pipe so as to impart a spiral flow to the fuel such that the fuel flows with reduced turbulence, thereby reducing vapor generation and with said helical directional control surface restricting backflow of fuel.

2. An apparatus according to claim 1 wherein said helical directional control surface extends within the filler pipe so as to complete at least one revolution.

3. An apparatus according to claim 1 wherein said helical directional control surface defines an inlet flow surface, with said inlet flow surface being generally concave.

4. An apparatus according to claim 1 wherein said helical directional control surface defines an inlet flow surface and a backflow surface, with said inlet flow surface being relatively smooth and with said backflow surface being relatively rough.

5. A fuel tank filler pipe for connection between an automotive fuel tank and a filler neck, with said pipe comprising:

a cylindrical tube having first and second ends, inner and outer sidewalls and a longitudinal axis, with said first end adapted to be positioned toward the fuel tank and with said second end adapted to be positioned toward the filler neck; and, a generally helical directional control surface extending within said tube and to a center thereof, with said helical directional control surface comprising an outer edge and an inner edge, with said outer edge lying adjacent an inner sidewall of said filler pipe and with said inner edge lying substantially along a central longitudinal axis of said filler pipe, with said helical directional control surface guiding fuel flowing through the filler pipe so as to impart a spiral flow to the fuel such that the fuel flows with reduced turbulence, thereby reducing vapor generation and with said helical directional control surface restricting backflow of fuel.

6. A fuel tank filler pipe according to claim 5 further comprising a chamfer formed between said inner sidewall and said second end of said tube, with said chamfer extending into said generally helical directional control surface.

7. A fuel tank filler pipe according to claim 5 wherein said helical directional control surface extends within said tube so as to complete at least one revolution.

8. A fuel tank filler pipe according to claim 5 wherein said helical directional control surface defines an inlet flow surface, with said inlet flow surface being generally concave.

9. A fuel tank filler pipe according to claim 5 wherein said inner edge of said helical directional control surface lies substantially along said longitudinal axis of said tube at least for a portion of the length of said helical directional control surface, with both said inner and outer edges lying adjacent said inner sidewall at said second end of said tube, thereby further restricting backflow of fuel.

10. A fuel tank filler pipe according to claim 5 wherein a longitudinally extending wall is formed between said inner edge of said helical directional control surface and said inner sidewall of said tube and extends toward said first end of said tube.

11. A fuel tank filler pipe according to claim 5 wherein said helical directional control surface defines an inlet flow surface and a backflow surface, with said inlet flow surface being relatively smooth and with said backflow surface being relatively rough.

12. A fuel tank filler pipe for connection between an automotive fuel tank and a filler neck, with said pipe comprising:

a cylindrical tube having first and second ends, inner and outer sidewalls and a longitudinal axis, with said first end adapted to be positioned toward the fuel tank and with said second end adapted to be positioned toward the filler neck;

a generally helical directional control surface extending within said tube so as to complete at least one revolution, with said helical directional control surface comprising:

an outer edge attached to said inner sidewall of said tube;

an inner edge lying substantially along said longitudinal axis of said tube at least for a portion of the length of said helical directional control surface;

a relatively smooth inlet flow surface; and, a relatively rough backflow surface; and, wherein said helical directional control surface guides fuel flowing through the filler pipe so as to impart a spiral flow to the fuel such that the fuel flows with reduced turbulence, thereby reducing vapor generation and with said helical directional control surface restricting backflow of fuel.

13. A fuel tank filler pipe according to claim 12 wherein both said inner and outer edges are attached to said inner sidewall at said second end of said tube, thereby restricting backflow of fuel.

14. A fuel tank filler pipe according to claim 12 further comprising a chamfer formed between said inner sidewall and said second end of said tube, with said chamfer extending into said generally helical directional control surface.

15. A fuel tank filler pipe according to claim 12 wherein said second end of said tube includes a rib extending around said outer sidewall of said tube for attachment to the filler neck.

16. A fuel tank filler pipe according to claim 12 further comprising a mounting flange disposed about said outer sidewall for mounting said filler pipe to the fuel tank.

17. A fuel tank filler pipe according to claim 12 wherein a longitudinally extending wall is formed between said inner edge of said helical directional control surface and said inner sidewall of said tube and extends toward said first end of said tube.

* * * * *